United States Patent [19]
Grover

[11] Patent Number: 6,134,974
[45] Date of Patent: Oct. 24, 2000

[54] INCREMENTAL FILAMENT TENSION MEASUREMENT DEVICE AND METHOD

[75] Inventor: David N. Grover, Littleton, Colo.

[73] Assignee: Montech Systems, Inc., Englewood, Colo.

[21] Appl. No.: 09/103,073

[22] Filed: Jun. 23, 1998

[51] Int. Cl.⁷ ..................................................... G01L 1/04
[52] U.S. Cl. ..................................................... 73/862.451
[58] Field of Search .................. 73/862.451, 160, 73/159, 826, 827, 828, 812

[56] References Cited

U.S. PATENT DOCUMENTS

| | | |
|---|---|---|
| 3,176,510 | 4/1965 | Kimmell et al. . |
| 3,372,582 | 3/1968 | Weiss et al. . |
| 3,720,100 | 3/1973 | Grunbaum . |
| 4,000,641 | 1/1977 | Lewis ........................................... 73/9 |
| 4,587,855 | 5/1986 | Yamada et al. . |
| 4,833,927 | 5/1989 | Park . |
| 5,029,469 | 7/1991 | Chase et al. .............................. 73/159 |
| 5,564,573 | 10/1996 | Palm et al. . |
| 5,892,157 | 4/1999 | Syre' ....................................... 73/812 |

FOREIGN PATENT DOCUMENTS

| | | |
|---|---|---|
| 194241 | 7/1994 | Japan . |
| 7412632 | 3/1976 | Netherlands . |

OTHER PUBLICATIONS

Engineering Data Sheet, "General Information: N2A–Series Transducer–Class Strain Gages", MM Measurement Group, Inc., Micro–Measurements Division, Raleigh, North Carolina.

Article, "Load Cells" from Strain Gage Based Transducers, pp. 14 and 17.

*Primary Examiner*—Benjamin R. Fuller
*Assistant Examiner*—Jewel V. Thompson
*Attorney, Agent, or Firm*—Pittenger & Smith, P.C.

[57] ABSTRACT

The tension in a filament is measured by deflecting the filament between two outer contact elements by a centrally-located deflecting contact element. A computer receives signals related to the displacement of the contact members, the force on the deflecting contact member and a plurality of relative displacement intervals of the contact elements. The computer determines a plurality of incremental force values related to the force on the deflecting contact element at each of the displacement intervals and calculates the tension in the filament based on the selected incremental force values. Force on the deflecting is measured by obtaining a force signal created by force on the deflecting contact element, establishing two different set values which are related to but not the same as the force signal, comparing the two set values with the force signal, amplifying the difference between each of the two set values and the force signal by a predetermined gain factor to create two final values within a predetermined range of values, and calculating the force on the deflecting contact element by a mathematical operation which uses the two set values, the final values, and the gain factor.

28 Claims, 9 Drawing Sheets

INCREMENTAL FILAMENT TENSION MEASUREMENT DEVICE AND METHOD

This invention relates to the measurement of tension in elongated filament-like elements, such as drive belts, cords, strands, ropes, threads, fibers, cables and the like, all of which are referred to generically herein as "filaments." More particularly, the present invention relates to a new and improved tension measurement device and method which measures force and calculates tension in a reliable and precise manner from a plurality of force and tension values obtained at increments of deflection of the filament, which is capable of incorporation in a device using relatively low cost components and in a manner, and which minimizes the amount of operator interaction required for using the device.

BACKGROUND OF THE INVENTION

A number of practical applications make it necessary or desirable to measure or adjust the tension in a filament. For example, the drive belts of an automobile engine must be adjusted to the proper tension to prevent premature wear and failure of the accessories which the belts drive and to prevent the belt from slipping or coming off of the pulleys or sprockets which support the belt. Similarly, the proper fabrication of a stranded rope or cable requires that the tension of the strands be properly controlled when those strands are wound together. Weaving fabrics requires a control over the tension in the individual threads. The tension in suspended filaments, such as electrical power lines, chair lift haul cables, well drilling tool lifting cables, and passenger elevator lift cables must also be checked periodically to determine the tension for safety and other reasons. The tension in the belts and cords which are employed in automobile tires and in drive belts must also be controlled when the tires are manufactured. In short, a myriad of different situations require the tension of a filament to be measured and determined, and most of these situations require the tension to be measured without gaining access to the ends of the filament and while the filament is experiencing tension.

A variety of measurement devices are available for measuring the tension in contained or endless filaments. One of the most common types of tension measuring devices operates on a geometric principal where the filament is deflected laterally between a pair of stationary reference points by a laterally deflecting element which is located midway between the stationary reference points. The force on the laterally deflecting element is created by the tension in the filament. The amount of force on the laterally deflecting element is measured. Because of the geometric relationship of the stationary reference points and the laterally deflecting element, the measured force is trigonometrically related to tension in the cable.

Despite this well known relationship, previous tension measurement devices do not account for variation in filament widths and result in inaccurate tension measurements in many situations. Other previous devices attempt to determine the tension measurements using analog measurements of mechanical devices such as occur from spring deflection. Such analog measurements and calculations can not be precise enough to supply accurate measurements. In addition, many such prior devices require manual adjustment and setup, which is difficult or impossible for a non-skilled operator to accomplish with sufficient facility to obtain accurate tension measurements. Furthermore, some prior tension measurement devices require that the operator establish certain initial conditions, such as a predetermined amount of filament deflection, before the measurement can be accomplished. These initial conditions are intended to avoid having to account for many of the practical variables which may influence the tension measurement, such as temperature, friction and the angle or amount of filament deflection. Lastly, although the geometric and trigonometric relationships used to measure tension are sound from a theoretical standpoint, problems occur because of aberrant influences. Examples of aberrant influences include unexpected and possibly unexplained force measurements. These aberrations will also influence tension calculation, because the tension is directly related to the force measurement. All of these factors contribute to prior tension measured devices having reduced accuracy and difficulty of operation.

It is with respect to these general considerations, and other more specific background information, that the present invention has evolved.

SUMMARY OF THE INVENTION

In general, the present invention improves the calculation of tension by the use of a number of improved techniques, all of which contribute to higher precision. Those improved techniques include obtaining the final value of the tension based on a plurality of different individual tension measurements, obtaining the individual tension measurements at a plurality of different filament deflection angles, limiting the range of deflection angles to a predetermined range of angles where the response is approximately linear and therefore more uniformly related to the actual tension in the filament, evaluating each of the individual ones of the plurality tension measurements for aberrant values, disregarding or diminishing the aberrant values before obtaining the overall final tension measurement, measuring the force on the deflecting element more accurately while using relatively inexpensive components in the measurement device, and automatically establishing operating conditions used in the force measurement and tension calculation while using the device and performing the method without requiring specific additional actions by the operator, among other things.

These and other improvements are obtained in a tension measurement device of the type which calculates tension in a filament by laterally deflecting the filament between two outer contact elements by force applied to a deflecting contact element positioned between the two outer contact elements. A displacement transducer is connected to create a displacement signal indicative of the relative displacement of the outer contact elements and the deflecting contact element. A force transducer is connected to the deflecting contact element to create a force signal indicative of the force applied on the deflecting contact element as a result of the relative movement or displacement of the contact elements. A computer receives the displacement and force signals and determines a plurality of displacement intervals over a range of relative displacement of the contact elements, determines a plurality of incremental force values related to the force on the deflecting contact element at each of the displacement intervals, selects a limited number of the incremental force values, and calculates the tension in the filament based on the selected incremental force values.

In a related manner, a method of the present invention also achieves these improvements. The method involves deflecting the filament between the two contact elements, measuring the relative displacement of the outer contact elements and the deflecting contact element when the filament is deflected, determining a plurality of displacement intervals over a range of relative displacement of the contact elements, determining a plurality of incremental force values related to the force on the deflecting contact element at each of the displacement intervals, selecting a limited number of the incremental force values, and calculating the tension in the filament based on the selected number of incremental force values.

Preferred aspects of both the tension measuring device and the method of calculating tension involve calculating a tension value from each incremental force value at each displacement increment with a mathematical operation using the tension values calculated at each displacement increment, filtering the plurality of tension values calculated at each displacement increment to remove or reduce the effect of any aberrant tension values from the mathematical operation, calculating a wrap angle of deflection of the filament at each displacement increment, and selecting a predetermined range of wrap angles, preferably in a linear range, from which to obtain the incremental force values to calculate the tension in the filament. In addition, other preferred aspects involve determining a displacement interval where the deflecting contact element first contacts the filament, and calculating a thickness dimension of the filament which is also employed in the mathematical operation to determine tension in the filament. Another preferred aspect involves determining a tare or "zero" force on the deflecting contact element to allow the measurement of incremental tension with reference to the tare force.

Improvements from the present invention also relate to measuring the force on the deflecting contact element. In this regard, the measurement device and the method both involve obtaining a force signal created by force on the deflecting contact element, establishing two different set values which are related to but not the same as the force signal, comparing the two set values with the force signal, amplifying the difference between each of the two set values and the force signal by a predetermined gain factor to create two final values within a predetermined range of values, and calculating the force on the deflecting contact element by a mathematical operation which uses the two set values, the final values, and the gain factor. The measurement device accomplishes these functions with an instrumentation amplifier which amplifies the magnitude of the displacement of the deflecting contact element and creates the coarse signal, an analog to digital converter (ADC) which converts the coarse signal into a coarse digital number, the computer executing an adjustment algorithm to create the set digital number, a digital to analog converter (DAC) which converts the set digital number into the set signal, a differential amplifier which amplifies, by a predetermined gain factor, the difference between the coarse and set signals to supply the signal.

Preferred aspects of the improved force calculation features of the present invention involve determining the two set values by comparing the final value to a selected value within the predetermined range of values, adjusting the set value until the two final values fall within a predetermined range of values, preferably near the midpoint of the predetermined range where the response of the system is more linear.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

DETAILED DESCRIPTION

Figure 1:
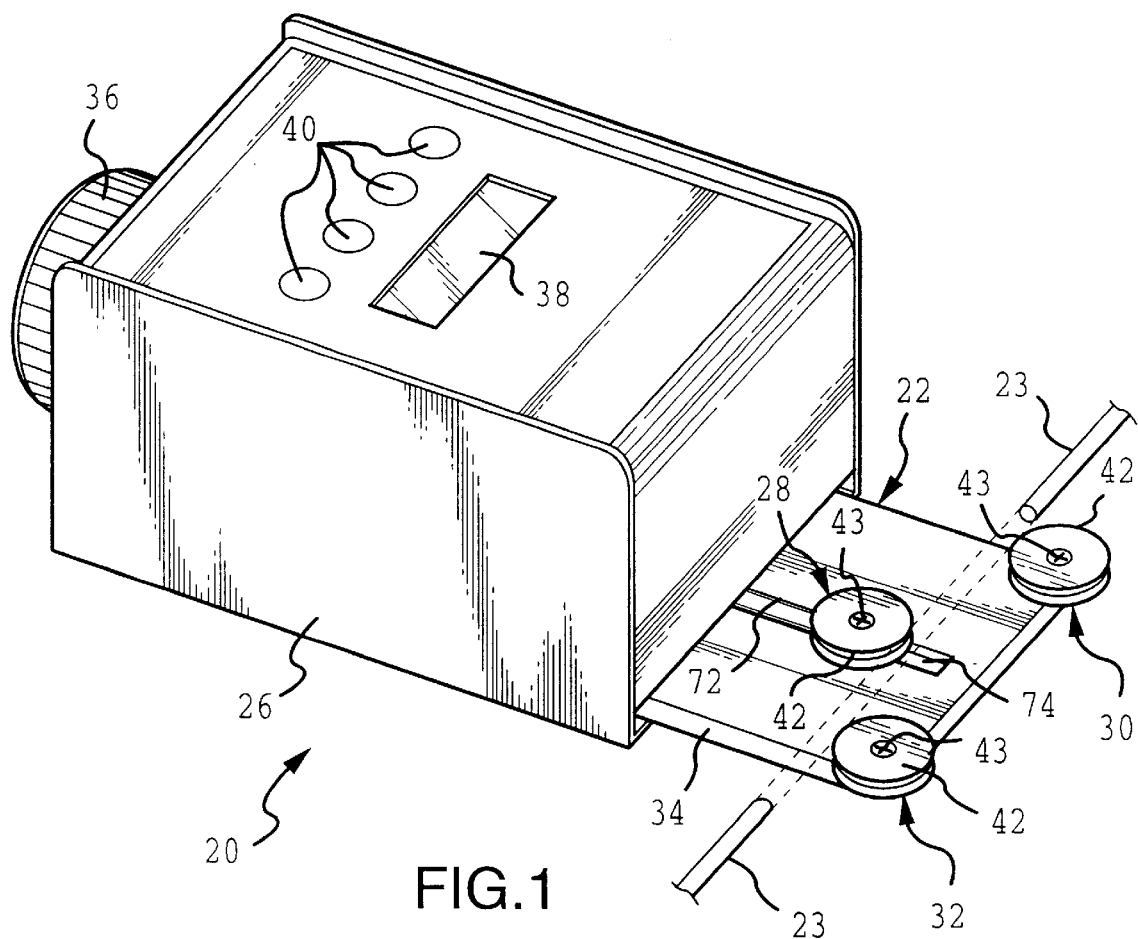
FIG. 1 is a perspective view of a filament tension measurement device which incorporates the present invention.
Figure 2:
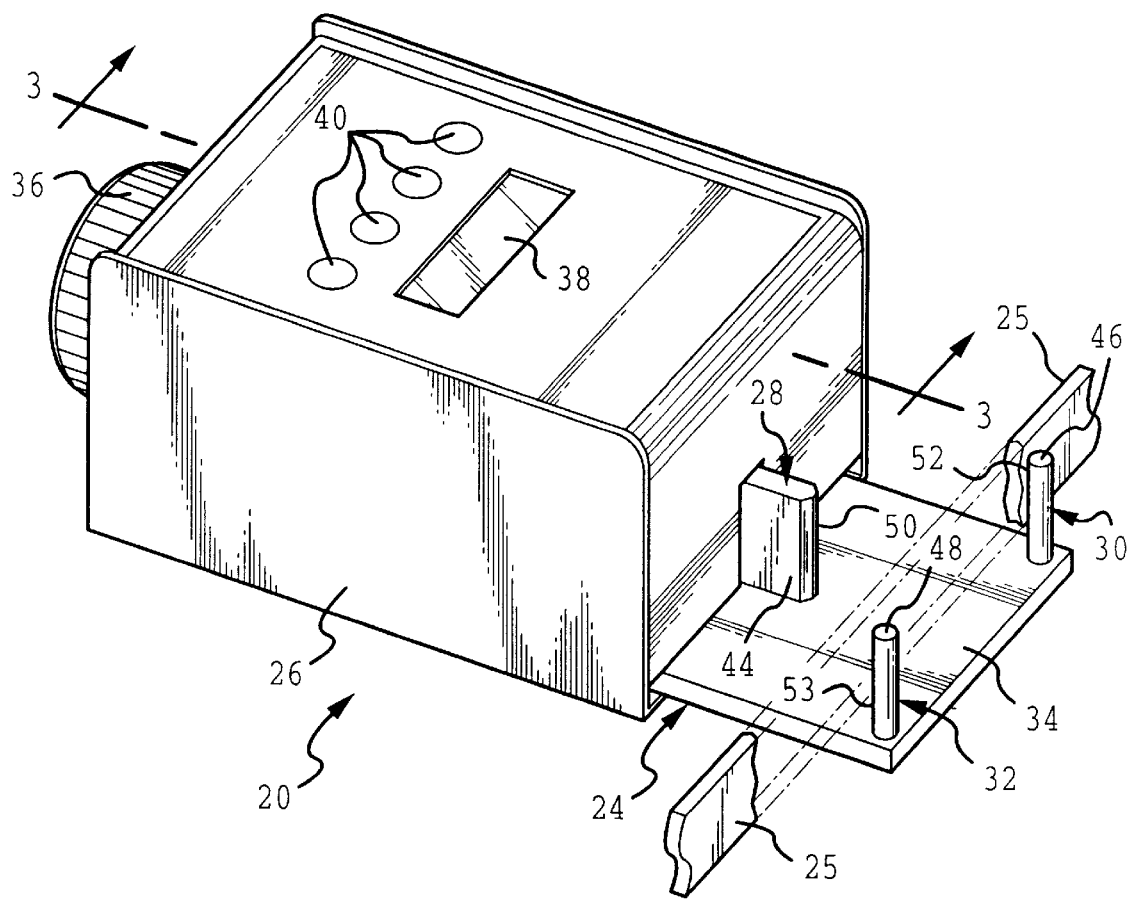
FIG. 2 is a perspective view of another embodiment of a tension measurement device, similar to the one shown in FIG. 1, which also incorporates the present invention.

Two embodiments of a filament tension measurement device which incorporate the present invention are shown in FIGS. 1 and 2, and both embodiments are referenced at 20. The two embodiments shown in FIGS. 1 and 2 differ primarily in the type of captor assembly associated with each device 20. The device 20 shown in FIG. 1 uses a captor assembly 22 which is intended to measure the tension in a filament 23. The device 20 shown in FIG. 2 uses a captor assembly 24 which is intended to measure the tension in a flat beltlike filament 25. The term used generically herein to refer to an elongated element, such as a drive belt, cord, strand, rope, thread, fiber, cable or the like in which tension is to be measured, including those filaments shown at 23 and 25 in FIGS. 1 and 2, respectively, is a "filament."

Each measurement device 20 includes a housing 26 within which each captor assembly 22 and 24, and all of the components of the device 20, are located and attached. Each captor assembly 22 and 24 includes a center deflecting contact element 28 upon which force is applied when the tension in the filament is measured. Each captor assembly 22 and 24 also includes two outer contact elements 30 and 32. The outer contact elements 30 and 32 are laterally displaced on opposite sides of the center contact element 32. The outer contact elements 30 and 32 are rigidly connected to and carried by a mover plate 34. The mover plate 34 is moveably connected to the housing 26 and moves in a longitudinal direction perpendicular to a line between the two outer contact elements 30 and 32 and parallel to a longer side dimension of the housing 26. The two outer contact elements 30 and 32 thus move in a direction generally parallel to the direction that the center contact element 28 extends from the housing 26.

To move the mover plate 34 and the connected outer contact elements 30 and 32 longitudinally, a control mechanism or knob 36 is manually turned. The knob 36 is connected within the housing 22 so that rotation of the knob 36 extends and retracts the mover plate 34 and the contact elements 30 and 32 relative to the deflecting force-measuring contact element 28. Rotating the knob 36 in one direction extends the mover plate to open the captor assembly 22/24 so that the filament may be positioned between the outer contact elements 30 and 32 and the deflecting contact element 28. Rotating the knob 36 in the opposite direction closes the captor assembly 22/24 so that the filament is captured or trapped between the contact elements 28, 30 and 32.

Figure 6:
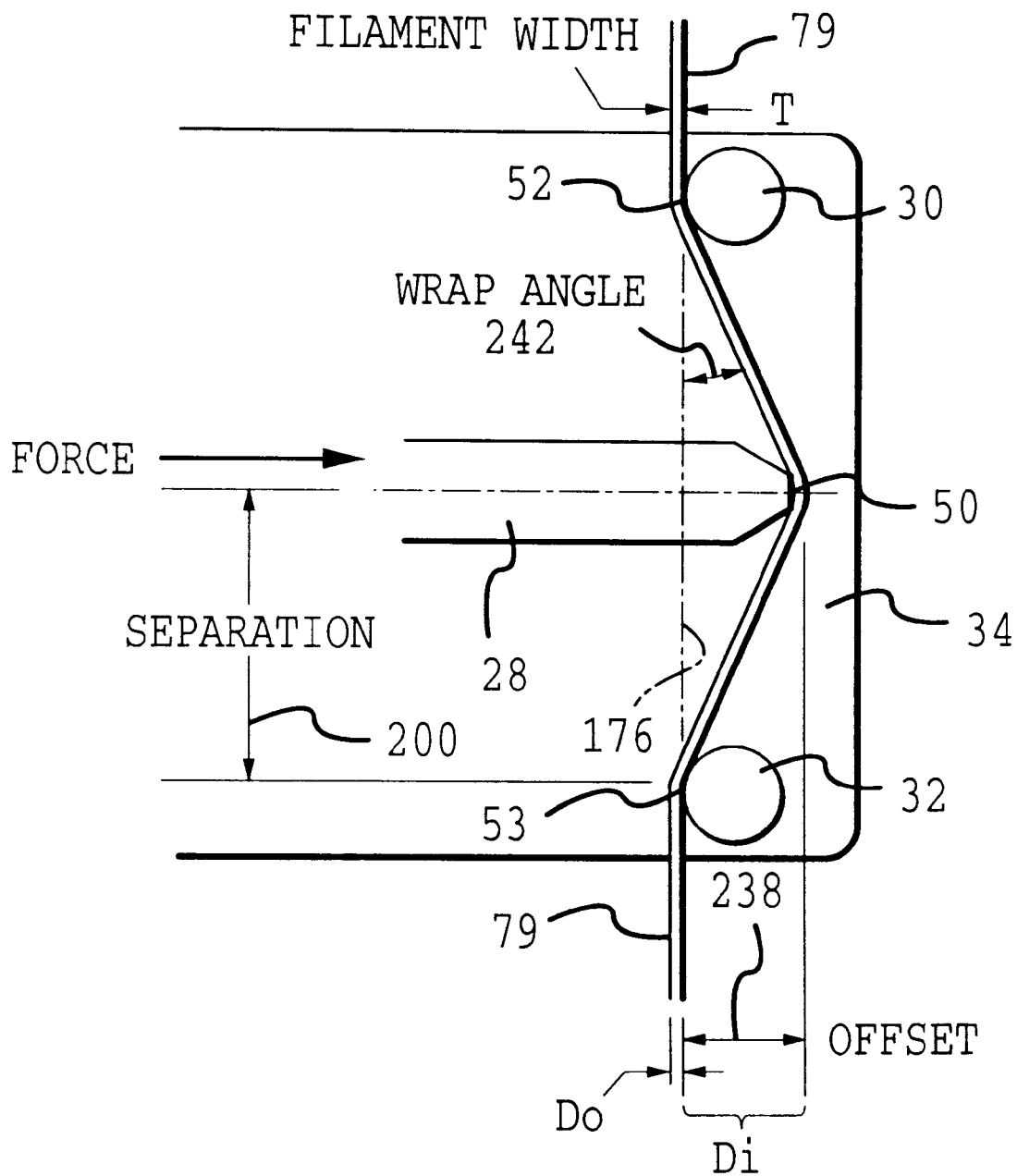
FIG. 6 is a top view schematic diagram of a captor assembly of the measurement device shown in FIG. 3, illustrating various quantities and terms employed in the measurement and calculation of tension.

After the filament is captured, the control knob 36 is further turned to deflect the filament between the contact elements 28, 30 and 32 as shown in FIG. 6. The deflection of the filament between the contact elements 28, 30 and 32 applies force on the center, deflecting contact element 32 in a longitudinal direction toward the housing 26. The force on the deflecting contact element 28 is measured by an electronic calculation system contained within the housing 26. The tension in the filament is thereafter calculated based on the force measured, the thickness of the filament whose tension is be measured, a known geometric relationship of the contact elements 28, 30 and 32, and other predetermined information used by the calculation system.

Information concerning the tension calculation, the force measurement, and any of the other factors used in making the tension calculation and force measurement may be selectively displayed to the user on a display 38 connected to the housing 26. A plurality of control switches 40 are also located on the exterior of the housing 26 by which the user controls the operation of the calculation system and the display 38.

The contact elements 28, 30 and 32 of the tension measurement device 20 shown in FIG. 1 are rollers 42 located on shafts 43. The shafts 43 are rigid enough to prevent bending movement, so forces applied on the rollers 42 by the deflected strand 23 are transferred directly through the contact elements 28, 30 and 32. The rollers 42 are used when the tension measurement device 20 is used primarily in dynamic applications, where the filament may be moving during the measurement.

The tension measurement device 20 shown in FIG. 2 is used for measuring the tension in static or non-moving filaments. In the static embodiment of the tension measurement device 20 shown in FIG. 2, the contact elements 28, 30 and 32 are contact block 44 and contact posts 46 and 48, respectively. The contact block 44 includes a narrow forward-facing contact edge 50 to minimize friction from the contact edge on a wide flat filament 25. The contact edge 50 may be sized, curved or rounded to assist in minimizing the contact point. Similarly, the contact posts 46 and 48 may also have rearward-facing contact edges 52 and 53, respectively, which are also sized, rounded or curved to minimize the contact area with the flat filament 25. In the case of the contact posts 46 and 48 shown in FIG. 2, the posts 46 and 48 are cylindrical in shape which provides the relatively minimal contact areas from the edges 52 and 53. Minimizing the contact points of the elements 28, 30 and 32 with the belt 52 assures that the physical contact with the filament does not diminish or adversely influence the amount of force created by the tension in the filament on the deflecting contact element 28. With reference to the orientation of the contact edges 50, 52 and 53, and as used herein, the term "forward" is intended to refer to the direction of the captor assembly 22/24 with reference to the housing 26, and the term "rearward" is intended to refer to the direction of the control knob 36 with reference to the housing 26.

Figure 3:
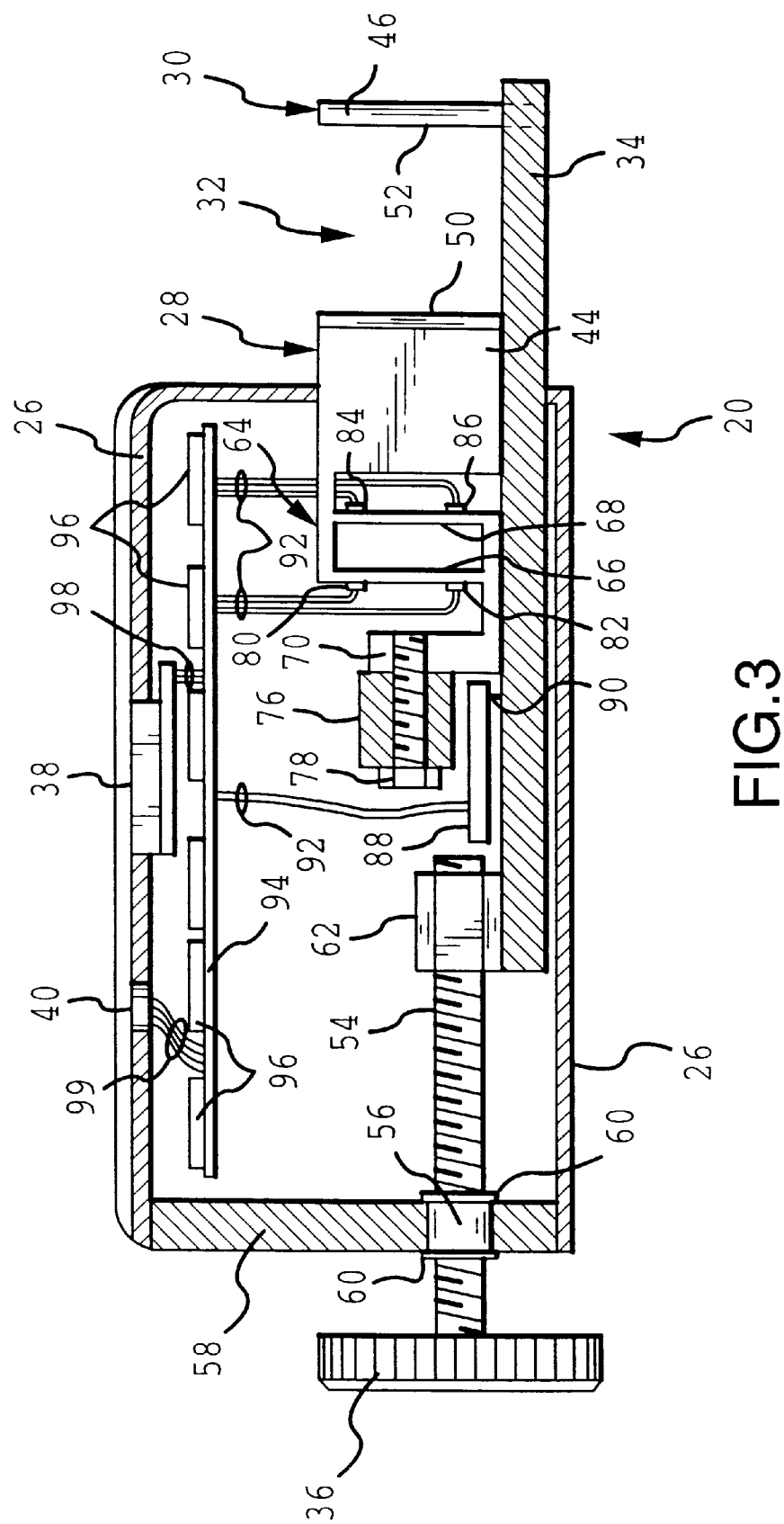
FIG. 3 is a side section view taken substantially in the plane of line 3—3 of FIG. 2.

The height or vertical dimension of the contact block 44 and the contact posts 46 and 48 may be of any size sufficient to extend across the full width of the flat filament 26. Of course, the size of the housing 26 must be adjusted to accommodate the height of the contact block 44, as will be apparent from the following discussion of a dual beam spring element which is shown in FIG. 3. Similarly, the height or thickness of the rollers 42 used in the dynamic embodiment of the tension measurement device 20 shown in FIG. 1 may be adjusted to accommodate narrow diameter round strand-type filaments or to accommodate relatively thick flat belt-like filaments. In addition, the embodiment of the tension measurement device 20 shown in FIG. 1 may also be used to measure the tension in static belts, if desired.

More details concerning the tension measurement device 20 are shown in FIG. 3. The mover plate 34 is connected to the control knob 36 by a threaded shaft 54. The threaded shaft 54 is rigidly connected to the knob 36, and the shaft 54 extends through a sleeve 56 formed in an end piece 58 of the housing 26. Shoulders 60 are rigidly connected to the shaft 54 on opposite sides of the sleeve 56. Rotating the knob 36 and the shaft 54 does not advance the shaft 54 relative to the end piece 58 because the shoulders 60 contact the ends of the sleeve 56. The end of the shaft 54 opposite of the knob 36 is threadibly received within a nut 62 which is attached to the mover plate 34. The mover plate 34 is retained within the housing for longitudinal movement (left and right as shown in FIG. 3). When the knob 36 and shaft 54 are rotated, the nut 62 advances along the threads of the shaft 54, thus moving the mover plate 34 and the outer contact elements 30 and 32 longitudinally relative to the deflecting contact element 28.

Figure 4:
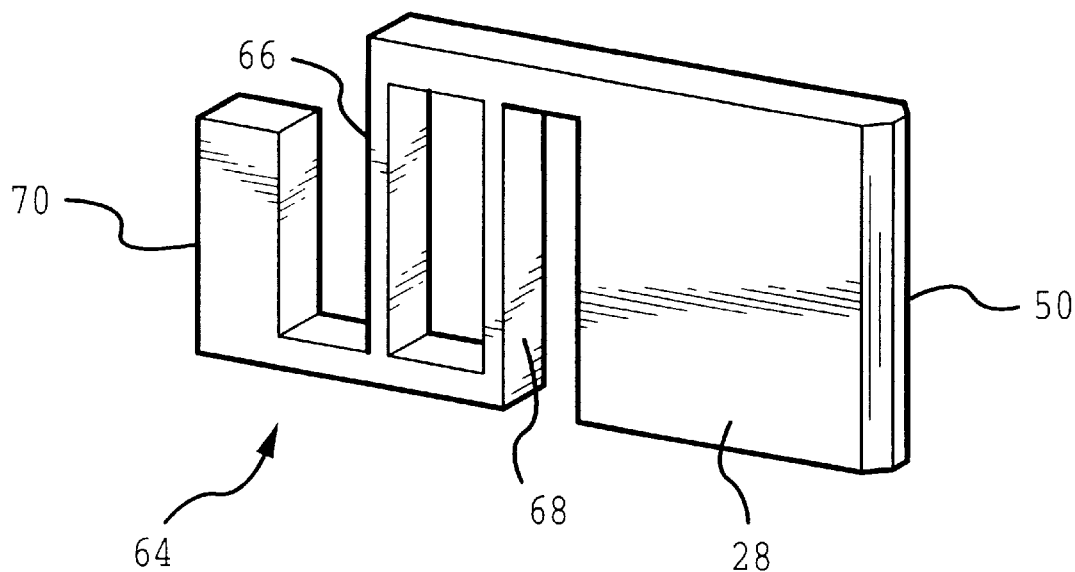
FIG. 4 is a perspective view of a dual beam spring element employed in the measurement device shown in FIGS. 2 and 3.
Figure 5:
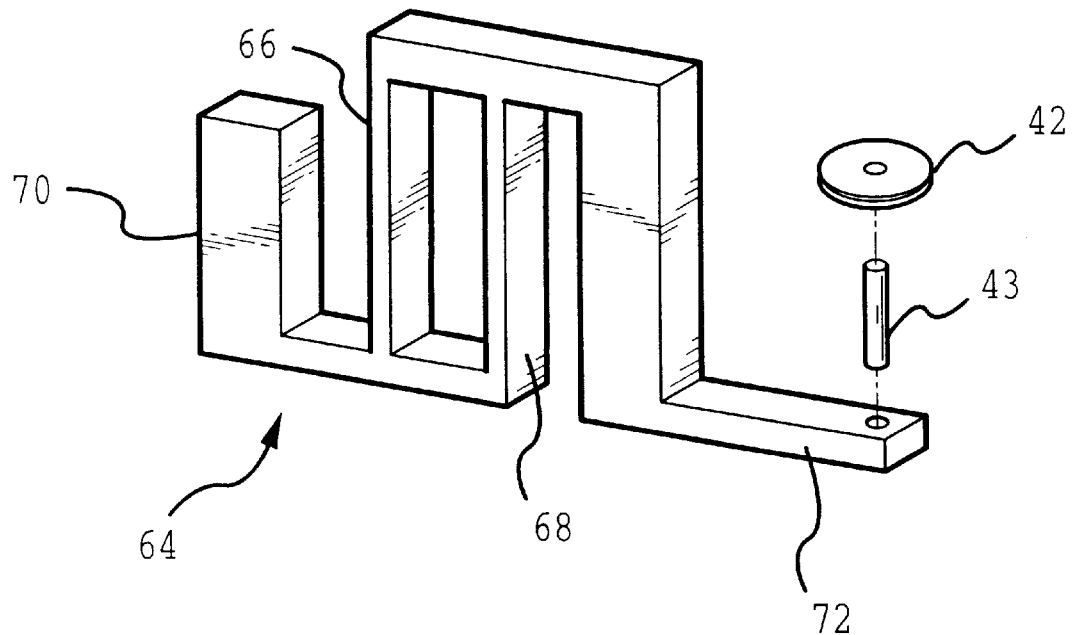
FIG. 5 is a perspective view of a dual beam spring element employed in the measurement device shown in FIG. 1, with some of the elements shown in FIG. 1 illustrated in exploded relation.

The deflecting contact element 28 is part of a conventional dual beam spring element 64, examples of which are shown in FIGS. 4 and 5. Each dual beam spring element 64 is preferably formed as an integral structure which includes a pair of parallel beams 66 and 68. The parallel beams 66 and 68 separate an inner retention end 70 of the dual beam spring element 64 from an outer end. In the case of the dual beam spring element 64 shown in FIG. 4, the outer end forms the contact block 44. In the case of the dual beam spring element 64 shown in FIG. 5, the outer end is an extension portion 72. As shown in FIGS. 1 and 5, a roller 42 is attached to the extension portion 72 by a shaft 43. A slot 74 (FIG. 1) is formed in the mover plate 34 to receive the extension portion 72, thereby locating all three rollers 42 at the same relative height.

The retention end 70 of the element 64 is rigidly connected to a transverse cross member 76 of the housing 26 by a bolt 78, as shown in FIG. 3. Retained in this manner, the retention end 70 is maintained in a stationary position relative to the housing 26. The extension portion 72 of the dual beam spring element 64 shown in FIG. 5 is located within the slot 74 and does not contact the mover plate 34. The contact block 44 of the dual beam spring element 64 shown in FIG. 4 is located above the surface of the mover plate (FIG. 2) to also avoid contact with the mover plate. Thus, both embodiments of the dual beam spring elements 64 are not influenced by the movement of or forces from the mover plate 34.

With a filament (79 in FIG. 6) captured and deflected between the contact elements 28, 30 and 32, an inward force is applied on the center contact element 28. This inward force causes both beams 66 and 68 (FIGS. 3–5) to bend slightly against the force applied on the contact element 28 by the tension in the filament 79. The amount of bending movement is sensed by conventional strain gages 80, 82, 84 and 86, which are bonded to the beams 66 and 68, as shown in FIG. 3. The strain gages 80 and 82 are bonded at upper and lower locations on the beam 66, respectively, and the strain gages 84 and 86 are bonded at upper an lower locations on the beam 68, respectively. The strain gages 80, 82, 84 and 86 are examples of transducers which generate signals of a predetermined magnitude relative to a predetermined amount of physical distortion. In the case of the strain gages 80, 82, 84 and 86, these devices exhibit a predetermined amount of change of electrical resistance relative to the amount of physical expansion or contraction that they experience. By locating the strain gages on the beams 66 and 68 in the positions shown in FIG. 3, the bending movement of the beams causes the strain gages to expand and contract, and the signals developed from their changed resistances are related to the amount of bending of the beams 66 and 68. The amount of bending of the beams 66 and 68 is also directly related to the force applied on the deflecting contact element 28 by the tension in the filament.

In addition to the signals obtained from the strain gages 80, 82, 84 and 86, signals are also obtained which relate to the amount of movement of the mover plate 34. A conventional precision potentiometer 88 is connected to the housing 26, and a wiper element 90 of the potentiometer 88 extends to and is connected to the mover plate 34. Longitudinal movement of the mover plate 34 causes the wiper element 90 to move and thereby vary the resistance of the potentiometer 88. The resistance of the potentiometer 88 is sensed and a signal corresponding to the position of the mover plate 34 is developed for use in the calculation of the filament tension.

The signals from the strain gages 80, 82, 84 and 86, and the signals from the precision potentiometer 88, are supplied on conductors 92 to a printed circuit board 94. The printed circuit board 94 which contains various electronic components 96 which constitute part of an electronic calculation system which performs the force measurements and the tension calculations. The signals representative of the force measurements and tension calculations are supplied on conductors 98 to the display 38. Control signals from the control switches 40 are supplied over conductors 99 to the printed circuit board 94.

Figure 7:
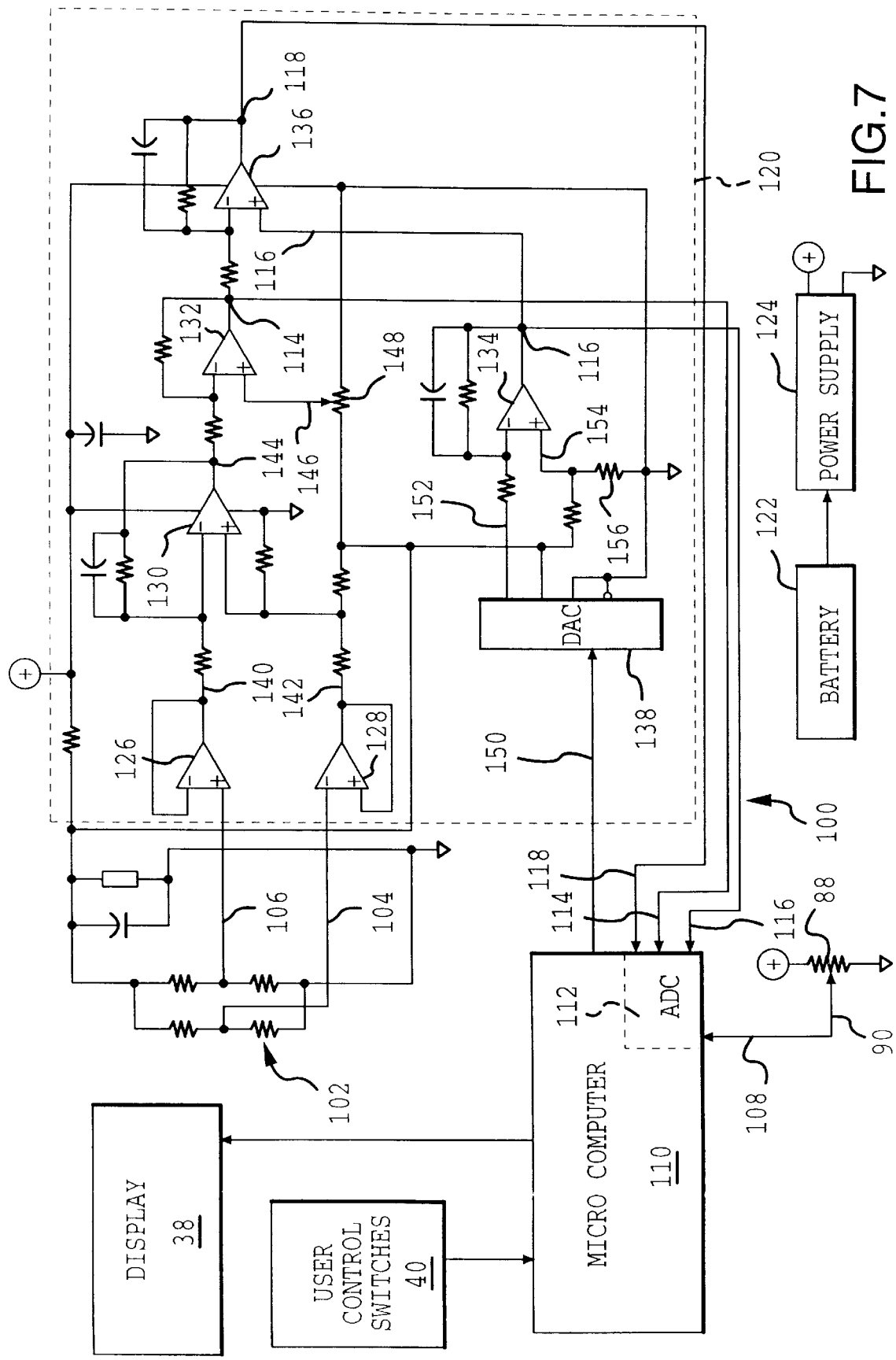
FIG. 7 is a block and schematic diagram of an electronic system, incorporated within the devices shown in FIGS. 1 and 2, for measuring and calculating tension and force.

The arrangement and function of the electronic components 96, the control switches 40, the display 38, and the strain gages 80, 82, 84 and 86 and the precision potentiometer 88, which constitute part of the calculation system is better understood by reference to FIG. 7, where the calculation system is referenced at 100. The resistances of the strain gages 82, 84, 86 and 88 are connected in a conventional Wheatstone bridge arrangement 102, and output signals which represent the resistances of the strain gages are supplied from the midpoints of the Wheatstone bridge 102 at 104 and 106. A signal representative of the resistance of the precision potentiometer 88 established by the position of the wiper 90 (which in turn is established by the position of the mover plate 34, FIG. 3) is available at 108. A conventional microcomputer 110 or microcontroller is connected to the display 38 and control switches 40. The microcomputer 110 includes a conventional analog to digital converter (ADC) 112, and the ADC 112 receives an analog signal at 108 from the potentiometer 88 and three analog signals 114, 116 and 118 from an instrumentation amplifier section 120 of the system 100. A battery 122 (not shown in FIG. 3) supplies electrical power to the system 100, and a conventional power supply 124 regulates the voltage from the battery 122.

The signals at 106 and 108 from the Wheatstone bridge 102 are supplied as input signals to the instrumentation amplifier circuitry 120. The instrumentation amplifier circuitry 120 includes a plurality of operational amplifiers (op amps) 126, 128, 130, 132, 134 and 136, as well as a conventional, relatively coarse resolution, digital to analog converter (DAC) 138, all of which are connected together as shown to function as described below.

Because of the placement of the strain gages 80, 82, 84 and 86 on the beams 66 and 68, as shown in FIG. 3, the force on the deflecting contact element 28 (rearward or from right to left as shown in FIG. 3), causes the strain gages 80 and 86 to expand and the strain gages 82 and 84 to contract. This expansion and contraction occurs because the rearward directed force from the deflecting contact element 28 moves the upper ends of the beams 66 and 68 rearward. This rearward movement bends the lower portion of beam 68 and the upper portion of beam 66 which slightly increases the outside dimension of the beams in those areas, thereby slightly expanding the strain gages 80 and 86. Conversely, the rearward movement of the deflecting contact element 28 bends the upper portion of beam 68 and the lower portion of beam 66 to diminish slightly the outside dimensions of those beams in those areas and therefore slightly contract the strain gages 82 and 84.

The contraction of the strain gages 82 and 84 causes their resistance to increase or decrease, depending upon the response characteristics of the strain gages 82 and 84, and the expansion of the strain gages 80 and 86 causes an opposite change in their resistances. The placement of the strain gages in the Wheatstone bridge 102, as shown in FIG. 7, causes the resistance of the strain gages 80 and 86 to change in the same direction, while the resistance of the strain gages 82 and 84 changes in the opposite direction. These changes have the affect of varying the magnitudes of the signals 104 and 106 in opposite relationships or directions relative to one another. The amount of the relative difference in magnitudes of the signals 104 and 106 is amplified in the well known manner by the Wheatstone bridge 102.

The signals 104 and 106 are buffered by the op amps 126 and 128, respectively, and buffered output signals are supplied at 140 and 142. The signals at 140 and 142 are applied to the inverting and non-inverting input terminals, respectively, of the differential op amp 130. The differential op amp 130 amplifies the difference between the signals 140 and 142, and supplies an output signal representative of that difference at 144.

The signal at 144 is applied to the inverting input terminal of the differential op amp 132. A signal at 146 is applied to the non-inverting input terminal of the op amp 132, and the signal at 146 is derived as a portion of the voltage from the power supply 124. The signal at 146 is established by a potentiometer 148. The signal at 146 is selected to be approximately at the midpoint of the voltage range between the positive power voltage level and the reference level established by the power supply 124.

The function of the differential op amp 132 is to further amplify the signal 142, and supply the output signal 114 which is an amplified version of the relative difference in magnitude between the signals 104 and 106. The relative difference in magnitude between the signals 104 and 106 represents the amount of bending of the beams 66 and 68

(FIG. 3), and the amount of bending of those beams is related to the amount of force applied on the deflecting contact element 28. Thus, the signal 114 represents the analog value of the force caused by the tension in the filament.

Because the voltage range of the analog signal at 114 is limited by the voltage range of power supply 124, for example in the neighborhood of 5 volts or less, the magnitude or value of the signal 114 can only be determined within a limited degree o precision. Since it is desired to obtain the high degree of precision in measuring the signal 114 without using extensive electronic components such as precision analog to digital converters, the remaining portion of the instrumentation amplifier circuitry 120 is used to obtain a high level of precision in measuring the signal 114 by using the relatively inexpensive op amps 134 and 136 and the relatively coarse resolution DAC 138. The signal 114 is a fairly precise analog voltage representative of the tension in the filament, but will be referred to hereafter as a coarse analog voltage signal, "Vc."

The coarse voltage Vc signal 114 supplied from the op amp 132 constitutes one of the input signals supplied to the ADC 112 of the microcomputer 110. The signal 114 is also applied to the inverting input terminal of the differential op amp 136.

To obtain a highly precise digital value of the coarse voltage Vc, the signal 114 is first converted by the ADC 112 into a digital value. The corresponding digital value is then adjusted by a resolution algorithm executed by the microcomputer 110. The adjusted value of Vc is different from but related to the converted digital value of the signal 114. This adjusted digital value is then supplied over a bus 150 to the DAC 138. The DAC 138 is a relatively inexpensive and low resolution count converter, for example a 256-count DAC. As such, the input signal supplied to the DAC 138, the adjusted digital value at 150, need only comprise a relatively low number of digital bits, for example 8. The adjusted digital value from the bus 150 is then converted by the DAC 138 into an adjusted analog signal and supplied at 152.

The adjusted analog signal at 152 is supplied to the inverting input terminal of the differential op amp 134. A reference signal at 154 is applied to the non-inverting input terminal of the op amp 134. The reference signal 154 is derived from a resistor network 156 which is connected to the positive voltage established by the power supply 124. The reference signal 156 establishes a reference level with respect to which the adjusted analog signal 152 is compared. If the adjusted signal 152 is much different than the reference signal 154, the gain of the op amp 134 cause it to saturate and the output signal at 116 will either reach the positive power supply level or reach the ground supply level. A signal at 116 which is at the positive power supply level or that the reference level will cause a further adjustment in the adjusted digital value applied on the bus 150, in the manner discussed below in conjunction with the signal 118. When the adjusted digital value at 150 is appropriate to avoid saturation, the adjusted analog signal 152 is in a range relative to the reference signal at 154 to cause the output signal 116 from the op amp 134 to be in a linear operating range between the positive supply voltage and reference potential, because the op amp 134 will not be in a saturated condition. The output signal at 116 from the op amp 134 is referred to as an analog voltage set signal "Vs," because it is established based on adjusted digital value applied on the bus 150.

The coarse voltage Vc signal 114 from the op amp 132 is applied to the inverting input terminal of the final op amp 136. The set voltage Vs signal 116 from the op amp 134 is applied to the non-inverting input terminal of the op amp 136. The set voltage Vs signal 116 thereby becomes a reference signal with respect to which the coarse voltage Vc signal 114 is compared by the differential op amp 136. If the level of the set voltage Vs signal 116 is at either the power supply level or the reference level, the comparison of the coarse voltage Vc signal 114 by the final op amp 136 will saturate the op amp 136, and its output voltage 118 will also be at the positive power supply level or at the reference level. Similarly, if the level of the set voltage Vs is not very close to the coarse voltage Vc at 114, the op amp 136 will also saturate to a voltage level at either the positive power supply or at the reference level.

The final output analog voltage signal 118, referred to herein as the final voltage "Vf" signal 118, is evaluated by the microcomputer 110, after the final voltage Vf signal 118 has been applied to and converted by the ADC 112. This evaluation results in the adjustment algorithm establishing a satisfactory level of the adjusted digital value at 150, in the manner discussed below in conjunction with FIG. 9, until a final voltage Vf output signal at 118 falls within the approximate mid-range of the power supply and reference voltages. Once two of these satisfactory final voltage Vf signals 118 have been obtained, the final values of those signals 118 and the values of the adjusted digital values supplied at 150 which created those satisfactory signals are employed in a force calculation algorithm to obtain a highly resolved and precise value for the coarse voltage Vc. The precise value of the coarse voltage Vc signal at 114 is directly related to the force applied on the deflecting contact element 28 by the tension in the filament undergoing the measurement.

Figure 8:
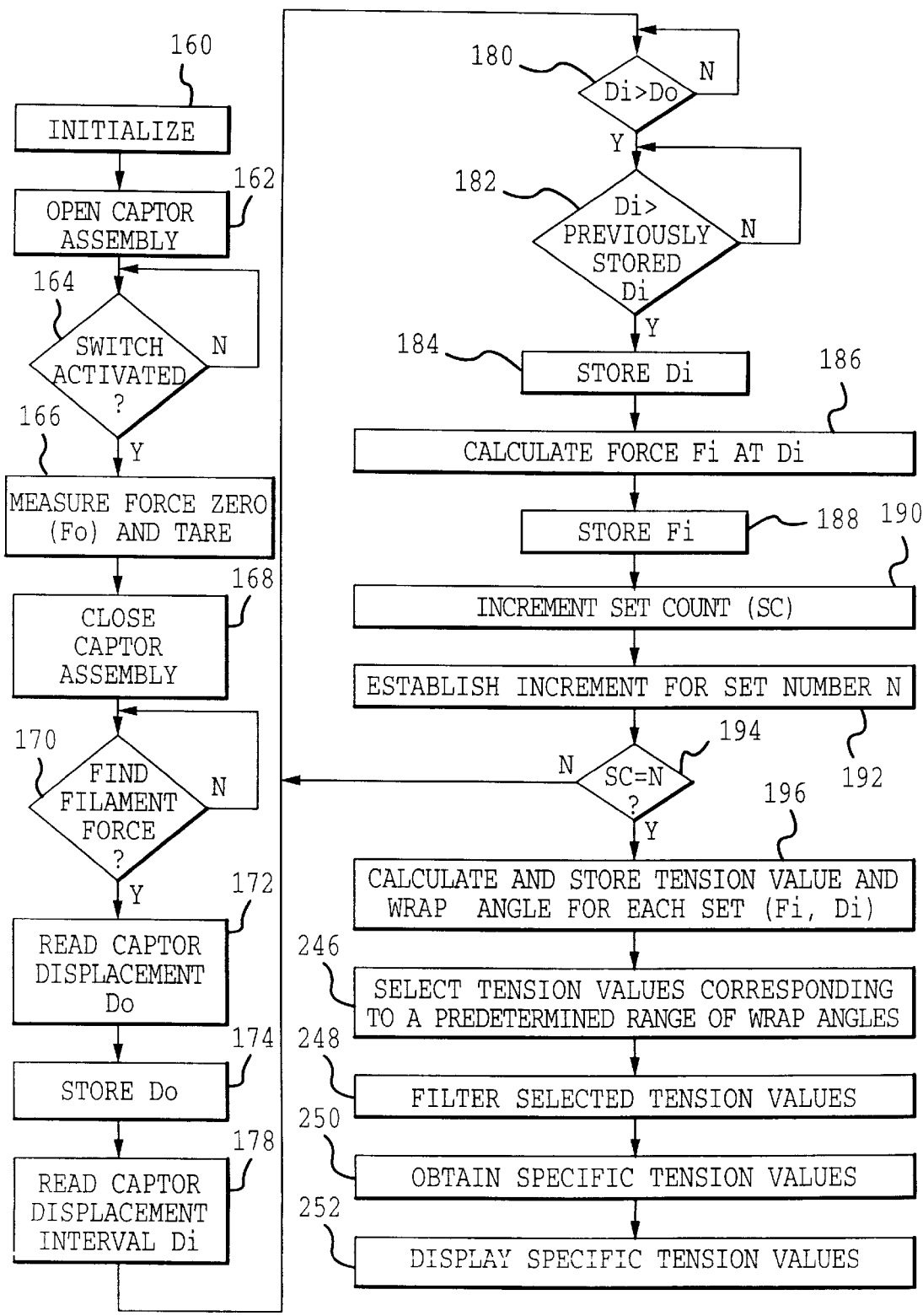
FIG. 8 is a flow chart of a tension measurement method of the present invention executed by the system shown in FIG. 7.

The use of the measuring device 20 to calculate the tension in a filament, and the calculation of the force on the contact element 28 of the captor assembly caused on the filament tension, can be understood by reference to FIG. 8. As shown in FIG. 8, various functions are illustrated by descriptive boxes which individually represent steps identified by reference numbers. Many of the functional steps referred to in FIG. 8 further refer to items previously described in connection with other drawings.

The measurement device 20 is initialized at step 160, preferably by the user depressing the appropriate ones of the control switches 40. In response to the initializing step 160, all previous values of other tension measurements and values which contribute to the tension measurements, are cleared from the memory of the microcomputer 110. Power is delivered from the battery 122 to the power supply 124 and the other electronic components.

Thereafter, the user opens the captor assembly 22/24 by turning the control knob 36, as shown at step 162. The filament is position between the center contact element 28 and the two outer contact elements 30 and 32. Thereafter, the microcomputer 110 determines, at step 164 whether one of the control switches 40 has been activated to indicate that the user desires to measure tension. Until such time as the measurement control switch 40 is activated at step 164, the process flow does not progress from step 164. Once the control switch 40 is activated to initiate the measurement process at step 164, the process flow continues to step 166.

At step 166, the microcomputer 110 measures the amount of force experienced by the deflecting contact element 28 before the filament is contacted. Presumably, this force will be close to zero. This measurement will take into consideration the physical orientation of the measurement device 20, and any effects caused by gravity and the position or orientation of the measurement device 20, as those factors may influence the force applied to deflecting contact element 28. Of course, these influences will be measured by the strain gages 80, 82, 84 and 86. This value of the zero force becomes a tare value which is stored in the memory of the microcomputer 110. The tare force is used to obtain more precise force measurements. An appropriate message is displayed on the display 38, to indicate to the user that the tare force conditions have been determined and that it is appropriate to start closing the captor assembly, as shown at step 168, by turning the control knob 36.

The captor assembly 22/24 continues to be closed by turning the control knob 36 until the deflecting contact element 28 contacts the filament and a predetermined minimum amount of force is applied on the deflecting contact element 28. This minimum amount of force is sensed or found at step 170. The predetermined minimum amount of force is determined to be that value which indicates that the captor assembly has closed sufficiently so that contact with the filament has been made and the tensioned filament is applying force on the deflecting contact element 28. Once this initial contact force is determined at step 170, the position or displacement (Do) of the mover plate 34 which resulted in this initial contact force is determined at step 172. This initial contact position Do is recorded in the memory of the microcomputer 110 at step 174. This initial position Do is then used to determine the thickness of the filament, which is represented by the dimension "B" shown in FIG. 6.

The filament thickness is determined by comparing the initial position Do, recorded at step 174, with a zero thickness position which has previously been determined during calibration of the measurement device 20. The zero thickness position is that position of the mover plate 34 where the rearward facing contact edges 52 and 53 of the outer contact elements 30 and 32, respectively, and the forward facing contact edge 50 of the deflecting contact element 28 occupy a linear relationship, as shown in FIG. 6 by a dashed reference line 176. The linear relationship represented by the reference line 176 represents a theoretical zero thickness filament. The zero thickness position is determined during calibration of the device 20 by use of conventional measurement devices. By comparing the initial contact position Do with the zero thickness position, the thickness of the filament (B, FIG. 6) is established. The thickness of the filament is used in the calculation of the tension, as described below.

Next, as shown in FIG. 8, the captor assembly is continually closed as a result of the step 168 continuing to move the mover plate 34 to a plurality of individual displacement intervals (Di) shown in FIG. 6. As discussed below, the force (Fi) at each displacement interval Di is measured.

Continued advancement of the captor assembly is determined at steps 180 and 182, to assure that new displacement interval Di values will only be generated as a result of continuing to close the captor assembly. If captor assembly ceases advancing, no further displacement interval Di and force increment Fi values will be measured or stored. At step 180, the incremental displacement Di of the captor assembly is compared to the initial contact position Do, and at step 182 a second comparison is made to determine that the captor assembly has moved beyond the previously stored displacement interval value, either Do or the previous value Di.

When both of the comparisons at 180 and 182 indicate that the captor assembly is continuing to close, the displacement interval value Di is stored at step 184 and the force Fi at that displacement interval Di is calculated at step 186 and stored at step 188. The values of the displacement interval Di and the force increment Fi stored at steps 184 and 188 form a correlated set of values which are used to calculate tension at each displacement interval. Thereafter for each correlated set of displacement interval and force increment values stored, a set count (SC) value is incremented at step 190. The set count (SC) represents the number of sets correlated displacement interval Di and force Fi values which have been determined and measured. As explained below, it is desirable to have a multiplicity of displacement interval and force value sets, for example 40 sets, because the present invention uses a predetermined subset of those values to establish a more linear region of information in which to more accurately calculate tension.

Based on the first displacement interval value stored at step 184 and the force calculated and stored at steps 186 and 188, and the thickness of the filament determined from the displacement determined at step 172, a predetermined displacement value for each displacement interval Di is established at step 192 for each of a predetermined plurality "N" of sets of correlated displacement interval Di and force increment Fi values. Thereafter, after each successive force increment Fi is measured at each successive displacement interval Di, the set count SC is compared to the number N of set counts desired at step 194. So long as the comparison at step 194 indicates that not all of the predetermined number of sets of displacement interval and force values have been measured and stored, the process flow moves from step 194 to step 180. Each successive transition through the steps 180, 182, 184, 186, 188, 190, 192 and 194 results in establishing a correlated set of displacement interval Di and force Fi values.

Once the desired predetermined number N of sets of correlated displacement interval Di and force Fi values have been obtained as determined at step 194, the tension value and a wrap or deflection angle for each set of displacement interval Di and force Fi values is calculated, as shown at step 196. To calculate the tension at step 196, the force Fi will have previously been calculated for each set of values, as shown at step 186 in FIG. 8. The force Fi is calculated by the process flow shown in FIG. 9, which is preferably achieved by programmed instructions executed by the microcomputer 110.

Figure 9:
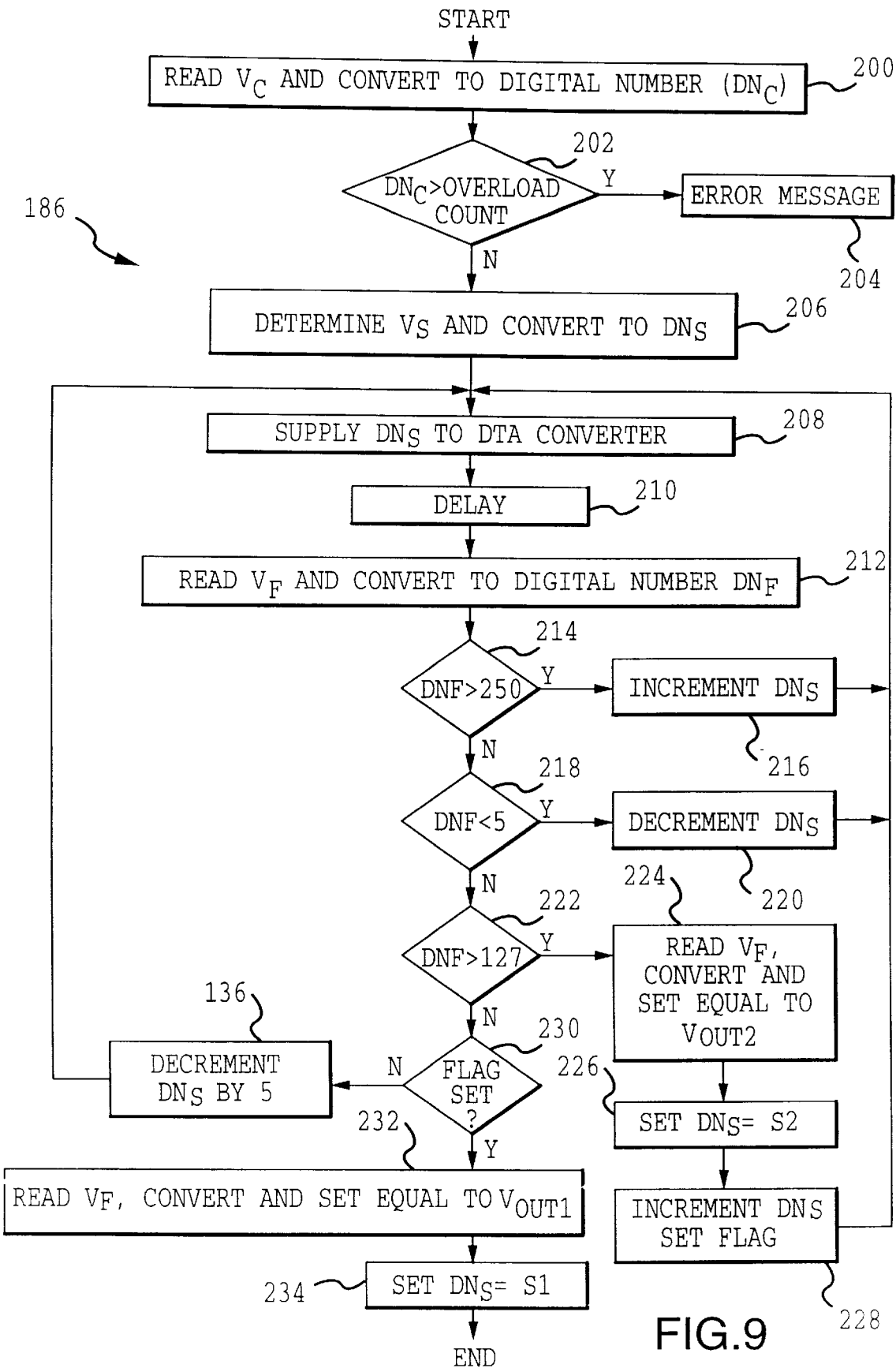
FIG. 9 is a flow chart of functions performed in calculating force in the method shown in FIG. 8.

The calculate force program flow 186 is shown in greater detail in FIG. 9. Many of the steps described in FIG. 9 refer to FIG. 7. The calculate force program flow 186 begins at step 200 where the coarse voltage Vc signal 114 is read and converted by the ADC 112 of the microcomputer into a coarse digital number (DNc). The coarse digital number DNc corresponds to the analog value of the coarse voltage Vc signal 114. The coarse digital number DNc represents the bending movement of the beam elements 66 and 68 (FIG. 3) and that bending movement is related to the force applied on the deflecting contact element 28 from the filament tension. Next, at step at 202 the coarse digital number DNc is compared to an predetermined overload count. The predetermined overload count is a number used to determine that the electronic components are working properly and that an error has not occurred. If the coarse digital number DNc is greater than the overload count, indicating that an error has occurred, an error message is displayed on the display 38, at step 204.

Next, at step 206, the adjustment algorithm of the microcomputer 110 is invoked, which will establish a set digital number DNs which is applied on the bus 150. The set digital number DNs is related to the coarse digital number DNc by the adjustment algorithm. The adjustment algorithm initially involves the following equation 1:

$$Y = M*X - B.$$

In equation 1, the term X represents the coarse digital value DNc which corresponds to the analog coarse voltage Vc signal at 114. The term M represents a multiplication factor which is multiplied by X (i.e. DNc). The multiplication factor M is determined according to the conversion relationship of the DAC 138 and the amplification factor of the op amp 134 relative to the reference voltage 154. The term B is an arbitrary value used to initially assure that the resulting value of Y, when converted to an analog signal by the DAC 138 and passed through the op amp 134 as an analog signal, will create an analog set voltage Vs signal 116 which is initially significantly more than the coarse voltage Vc.

The digital number DNs is supplied on the bus 150 to the DAC 138, as shown at step 208. Because the digital number DNs is more than the value necessary to establish a set voltage Vs signal 116 which is approximately equal to the coarse voltage Vc signal 114, the initial response of the final op amp 136 is to supply a saturated output final voltage (Vf) at the analog level of the positive power supply. The microcomputer 110 waits for a predetermined delay time, as shown at step 210, before reading the final voltage (Vf) signal 118 at step 212. The final voltage signal Vf is converted by the ADC 112 of the microcomputer 110 into a final digital number DNf which corresponds to the final voltage Vf signal 118, at step 212.

Next, at step 214, the final digital number value DNf is compared to a predetermined maximum count value indicative of a condition where the final op amp 136 is saturated at the positive power supply voltage. In the case of an eight bit digital number, the count value selected is 250, since that count value represents only five counts less than the maximum value which can be counted (the maximum count value being 255). Thus, using the maximum value of 250 assures that the comparison made at step 214 will recognize analog values of the final voltage Vf signal 118 which are essentially at the maximum value of the power supply.

If the comparison at step 214 shows that the value of final digital number value DNf is greater than a count value of 250, the set digital number DNs initially established by Equation 1 is incremented or increased by one digital count at step 216 and the process flow returns to step 208. Incrementing the set digital number DNs decreases the value of the analog set voltage Vs signal 116 applied to the final op amp 136. Because the initial level of the set voltage signal Vs was purposely established initially to be more than the coarse voltage Vc signal 114, incrementing the value of the set digital number DNs at step 216 will cause the set voltage Vs signal 116 to decrease and move closer to the value of the coarse voltage Vc signal. The process flow through the steps 208, 210, 212, 214 and 216 continues until the determination made at step 214 indicates that the final digital number DNf is less than 250.

When the final digital number DNf is reduced to below the count value 250, or if the initial value of the set digital number DNs creates a final voltage Vf signal 118 whose corresponding final digital number DNf is less than 250, the program flow moves to the comparison at step 218. The comparison at step 218 determines whether the final digital number DNf is less than a count value of 5. A count value of five is selected as a predetermined minimum digital number value that indicates the final voltage signal 118 may be essentially at the reference level, which is another indication of saturation of the final op amp 136. If the digital number DNf is less than a count value of 5, the set digital value DNs is decremented by one count value at step 220, and the process flow returns to step 208. Decrementing the set digital number value DNs by one count at step 220 has the effect of increasing the magnitude of the set voltage Vs signal 116, and causing the value of the coarse voltage Vc signal 114 to increase relative to the set voltage signal 116. The relative increase of the coarse voltage signal 114 relative to the set voltage signal 116 will cause the final op amp 136 to move away from the saturated condition where its output signal is at the reference level of the circuit. The process flow continues through steps 208, 210, 212, 214, 218 and 220 until the set digital number DNs has been decremented to a point where the final output voltage Vf signal 114, represented by the final digital number DNf, is of a count value greater than 5.

Since the initial value of the final digital number DNf will generally be too large, because of the subtraction of the B term in Equation 1, the value of DNf will generally start above the middle digital count value, i.e. 127, of the total of 255 digital count values. Furthermore, the output final voltage Vf signal 118 will generally remain at the level of the positive power supply voltage until the value of the set digital number DNs brings the output final voltage into the linear region between the positive power supply voltage and reference potential. This linear region is represented by a digital count value between 5 and 250. However, the gain "K" of the final op amp 136 is sufficiently high (e.g. 80) so that any significant difference in the signals 114 and 116 (e.g., represented by more than a few digital counts) will cause the output op amp 136 to remain saturated at either the positive power supply voltage or at the reference level until the appropriate value of the set digital number DNs is achieved. Consequently, there will generally be only two counts which will establish the output final voltage Vf in a non-saturated linear range, and those two counts will occur in the mid-range of the count values about which the count value 127 is centered. The objective of the force calculation algorithm 186 shown in FIG. 9 is to locate those two count values and use them to obtain a high resolution value of the force applied on the deflecting contact element 28.

As soon as the final digital number DNf falls below the count value of 250, as determined at step 214, the determination step at 222 causes the program flow to move to step 224, because as explained in the preceding paragraph, whenever the final op amp 136 is not saturated, the output final voltage Vf signal 118 is usable in the force calculation algorithm. The first value of the set digital number DNf which causes the final digital number DNf to fall below 250 will be read at step 224, converted by the ADC 112 and the final digital number value DNf and this value set to equal a value Vout2. The value Vout2 will be used in the calculation of the force, as is described below in connection with Equation 5 described below.

Also, as shown at step 226, the set digital number DNs, which resulted in the creation of the first value of DNf below the value of 250, is set equal to a value S2. The value S2 will also be used in the calculation of the force, as is described in connection with Equation 5.

After setting the digital number set value DNs equal to S2, DNs is incremented at step 228, and a flag is also set at step 228. Incrementing the set digital number value DNs at step 228 has the effect of changing the level of the set voltage Vs signal 116, and is intended to obtain the next or second set digital number value which will also create a non-saturated output final signal Vf from the op amp 136. After incrementing the value of DNs at step 228, the program flow then returns to step 208.

Because the set digital number DNs which existed previously to the incrementing step 228 resulted in the first value of the set voltage Vs signal 116 which did not result in a saturated output voltage signal Vf from the final op amp 136, the next incremented value of DNs is also likely to result in a non-saturated output signal from the op amp 136. The next incremented value of DNs results in a lower output final voltage Vf signal 118 whose corresponding final digital number value DNf is less than 127, as determined at step 222. However, this next lower value is still within the linear operating range between the positive power supply voltage and reference potential, and it will be used in the calculation of force according to Equation 5. Because a flag was set at step 228 when the previous value of the set digital number DNs was sufficient, a determination at step 230 will reveal that the flag has previously been set, and the program flow will progress to step 232.

The final digital number DNf resulting from incrementing the set digital number value DNs at step 228 is thereafter read at step 232, converted by the ADC 112 to a digital value, and that digital value is set equal to a quantity of Vout1. The set digital number value DNs which resulted in the quantity Vout1 is thereafter set to the value S1, as shown at step 234. The quantities Vout1 and S1 will be used as two of the factors in the below described Equation 5 to obtain the force value.

Should step 230 determine that the flag at step 228 has not been set, as would be the case if for some reason the initial value of the set digital number value DNs resulted in a final digital number value DNf below 127 (as determined at step 222), the value of the set digital number DNs is incremented by 5 at step 236. Thereafter, the program flow is returned to step 208. Incrementing the set digital number DNs by 5 each time that the determination at step 222 shows that DNf is less than 127 assures that the value of DNs will ultimately reach a value that will be sufficient to place DNf above 127, and the program flow can thereafter proceed in the manner described to establish the values for use in Equation 5.

Referring to FIG. 7, the output final voltage Vf signal 118 will be equal to the difference in the input coarse voltage Vc signal at 114 and the set voltage Vs signal at 116 multiplied by the gain of the op amp 136. This relationship is represented by following Equation 2, where the value K is the gain of the op amp 136:

$$Vf = (Vs - Vc)K.$$

Inserting the values previously derived from the program flow shown in FIG. 9 into Equation 2, the following two Equations 3 and 4 result:

$$Vout2 = (S2 - DNc)*K$$

and $$Vout1 = (S1 - DNc)*K$$

By adding Equations 3 and 4 and solving for the value DNc, the result is the following Equation 5:

$$DNc = (S1 + S2)/2 - (Vout2 - Vout1)/(2 \times K)$$

Since the values S1, S2, Vout2 and Vout1 have been determined by the program flow described in FIG. 9, and because the gain (K) of the final op amp 136 is known, the value of DNc is determined. This value is then related to the force applied on the deflecting contact element 28 when the device 20 is calibrated. The values of DNc are correlated to calibrated force values with the use of a look-up table recorded in the memory of the microcomputer 110. Thus, by use of the program flow shown in FIG. 9 and the Equation 5 described above, each force increment Fi is readily calculated and stored with the correlated displacement interval Di at steps 184, 186 and 188, as shown in FIG. 8.

With this information measured and calculated at steps 184, 186 and 188, the microcomputer 110 can then perform the calculations to determine the tension in the filament for each set of displacement increment and force increment values, Di and Fi, respectively, as shown in FIG. 8 at step 196.

The equation by which to determine tension from the force is understood by reference to the diagram shown in FIG. 6. The thickness of the filament 79 is represented by the quantity T. The thickness of the filament 79 is calculated in the manner previously described, by knowing the displacement interval where force is encountered (step 170, FIG. 8) and the calibrated zero displacement point (line 176, FIG. 6). The offset is the distance which the filament is deflected at the deflecting contact element 28, relative to the line 176. For a theoretical filament which has no thickness, the offset would be measured by the distance from the forward contact edge 50 of the deflecting contact element 28 relative to the line 176. As shown in FIG. 6, the offset is represented by the dimension 238. The separation is the distance parallel to the reference line 176 between the rearward contact edge 52 or 53 of the outer contact element 30 or 32, respectively, and the forward contact edge 50 of the deflecting contact element 28, assuming at the deflecting contact element 28 is located midway between the outer contact elements 30 and 32. The separation is represented by the dimension 240. The wrap or deflection angle is the angle between the reference line 176 and the deflection point of the filament located opposite of the forward contact edge 50 of the deflecting contact element 28. For a theoretical zero thickness filament, the wrap angle is at angle measured relative to the reference line 176 and a straight line between the rearward contact edge 52 or 53 of one outer contact element 30 or 32 and the forward contact edge 50 of the deflecting contact element 28. The wrap angle is illustrated at 242 in FIG. 6.

Tension in the filament is, of course, that force which extends along the length of the filament. When retained in the captor assembly as shown in FIG. 6, the tension in the filament is not materially changed as a result of the deflection between the contact elements 28, 30 and 32, for a reasonable range of wrap angles 242. Thus, using straightforward trigonometry, the relationship between the force and the tension is the trigonometric sine of the wrap angle 242. Tension is therefore calculated according to the following Equation 6:

$$Tension = Force/Sine\ of\ Wrap\ Angle.$$

The wrap angle is essentially equal to the trigonometric arctangent of the offset (238) plus the filament thickness (T) with this quantity divided by the separation distance (240), as shown by Equation 7:

$$Wrap\ Angle = Arctangent\ [(Offset + Filament\ Thickness)/Separation].$$

To simplify the calculation of tension and to avoid recording arctangent trigonometric values in a look-up table for access by the microcomputer, Equation 6 can be mathematically simplified and approximated for wrap angles up to about 10 degrees without a significant loss in accuracy by the following Equation 8:

$$Tension = (Force \times Separation)/(Offset + T)$$

Equation 8 is preferably used in the calculation of the tension shown at step 196 shown in FIG. 8. A tension value is calculated using Equation 8 and the tension values stored for each set of correlated force increment Fi and displacement interval Di values which have been stored at steps 184 and 188. In addition, for each calculated value of tension, the wrap angle is also calculated and its value stored at step 196 for each set of force and displacement increment values. The values of the calculated tension and wrap angle are stored in a correlated manner at step 196.

Figure 10:
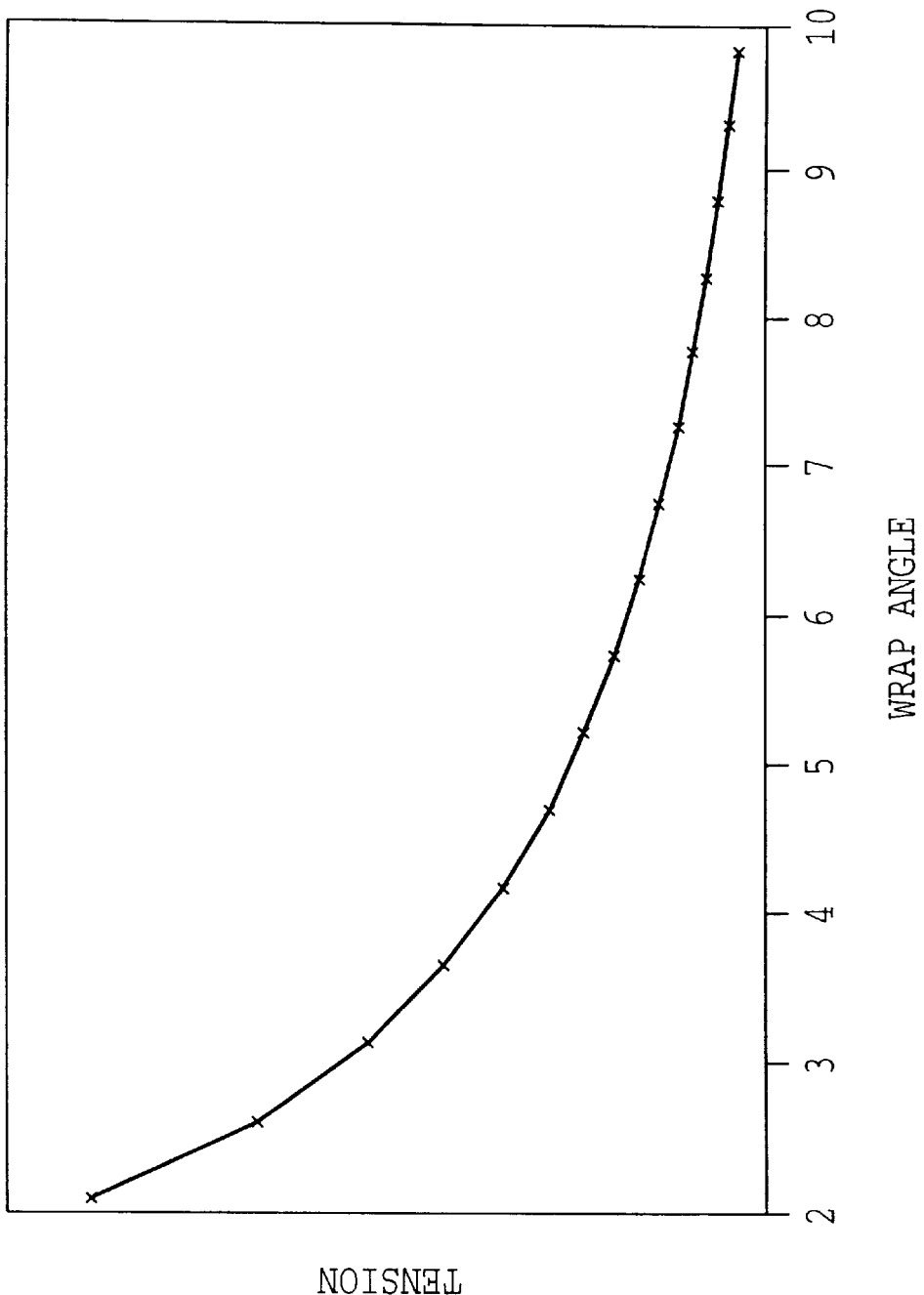
FIG. 10 is a graph illustrating the relationship between tension and wrap angle, which illustrates one of the factors in performing the method shown in FIG. 8.

Thereafter, as shown at step 246 in FIG. 8, a number or range of tension values which have been calculated at step 196 are selected which correspond to a predetermined range of wrap angles. The selection represented at step 246 is accomplished based on the curved relationship of tension and wrap angle shown in FIG. 10. As can be seen from FIG. 10, the relationship is nonlinear. At small wrap angles, the trigonometric sine of the wrap angle is a small value and this small value causes relatively greater changes in calculated tension, as is apparent from equation 6. However the value of the trigonometric sine of increasing wrap angles causes relatively lesser changes in calculated tension. Thus, the possibility of an increased influence from aberrations and errors is possible that smaller wrap angles, since calculated tension changes more rapidly for smaller changes in the wrap angle. On the other hand, at relatively high wrap angles, the deflection of the filament may be sufficient to cause the contact elements to adversely influence the tension in the filament, and thus the force measurement. Thus, a predetermined range of wrap angles, greater than the smaller wrap angles and less than the greater wrap angles, is selected over which to calculate the tension. For example, wrap angles in the range between approximately 2 to 6 degrees, and preferably in the range of 3 to 5 degrees, usually provide the best results for force measurements and tension calculations.

Once the predetermined range of wrap angles has been selected as shown in FIG. 8 at step 246, the tension values calculated from all of the wrap values within the selected range are filtered, as shown at step 248. Filtering generically refers to the process of evaluating the calculated values of tension to determine whether any aberrant values are present within the selected range of values, and then disregarding those aberrant values.

Specific tension values are obtained at step 250, generally by averaging all of the tension values which have been filtered at step 248. Although averaging is regarded as satisfactory method of obtaining a final tension measurement, particularly in view of the step of selecting the predetermined range of wrap angles at step 246 and thereafter filtering those values at step 248, other types of mathematical and statistical processing of the values may be applied to obtain the measured tension values.

Lastly, the specific tension values are displayed at step 252. The tension values to be displayed are determined by the user in depressing selected ones of the control switches 40. The type of information presented at the step 252 includes any the information which has previously been measured and stored, as well as collections of the information which are themselves subject to various mathematical and statistical processes.

By calculating the force with the iterative process described in FIG. 9, very precise measurements of the force applied from the filament on the captor assembly during deflection of the filament are obtained. These very precise measurements are available even though of relatively inexpensive analog and digital circuit components are employed to derive these values, thus enabling a relatively low or reduced cost measurement device 20 to provide a relatively high degree of accuracy and resolution in establishing the force measurement and tension calculation. By selecting the predetermined range of wrap angles to provide the most linear response, further errors in the calculation of the tension are avoided. Reductions in accuracy are further minimized by filtering the calculated tension values within the selected range of wrap angles, and then mathematically and statistically processing those values to obtain a final tension value. In addition, by providing the capability to tare the tension measurement device 20, any anomalies created by the manner in which the device is used are eliminated from the measurements and calculations. Tension measurements can be obtained effectively in both static filament and dynamic filament situations, using essentially the same basic device for the tension measurement device 20. Many other advantages and improvements will be apparent upon gaining a complete understanding and appreciation of the present invention.

Presently preferred embodiments of the invention and its improvements have been described with a degree of particularity. This description has been made by way of preferred example. The scope of the present invention is defined by the following claims, and this scope should not necessarily be limited by the detailed description of the preferred embodiment set forth above.

The invention claimed is:

1. A tension measurement device for calculating tension in a filament by laterally deflecting the filament between two outer contact elements by force applied to a deflecting contact element positioned between the two outer contact elements, comprising:

a displacement transducer connected relative to at least one of the outer contact elements and the deflecting contact element to create a displacement signal indicative of the relative displacement of the outer contact elements and the deflecting contact element;

a force transducer connected to the deflecting contact element to create a force signal indicative of the force applied on the deflecting contact element as a result of the relative movement of the contact elements against the filament; and a computer that is in communication with the measurement transducers, receives the displacement signals and force signals and retrievable stores each said displacement signal with its associated force signal, where said computer uses each of said associated displacement and force signals operationally to;

determine from the displacement signal a plurality of displacement intervals over a range of relative displacement of the contact elements;

determine from the force signal a plurality of incremental force values related to the force on the deflecting contact element occurring at each of the displacement intervals;

select a number, less than all, of the incremental force values to be used to calculate the tension in the filament; and calculate the tension in the filament based on the selected number of incremental force values.

2. A tension measurement device as defined in claim 1 wherein the computer is further operative to:

calculate a tension value from each incremental force value at each displacement increment.

3. A tension measurement device as defined in claim 2 wherein the computer is further operative to:

calculate the tension in the filament from a mathematical operation using the tension values calculated at each displacement increment.

4. A tension measurement device as defined in claim 3 wherein the computer is further operative to:
   filter the plurality of tension values calculated at each displacement increment to remove any aberrant tension values from the mathematical operation.

5. A tension measurement device as defined in claim 3 wherein the computer is further operative to:
   filter the plurality of tension values calculated at each displacement increment to reduce the effect of any aberrant tension values in the mathematical operation.

6. A tension measurement device as defined in claim 2 wherein the computer is further operative to:
   calculate from the displacement signal a wrap angle of deflection of the filament at each displacement increment; and
   correlate each calculated wrap angle with the calculated tension value that each displacement increment.

7. A tension measurement device as defined in claim 6 wherein the computer is further operative to:
   select a predetermined range of wrap angles from which to obtain the incremental force values to calculate the tension in the filament; and
   calculate the tension in the filament from a mathematical operation using the tension values calculated at each displacement increment within the predetermined range of wrap angles.

8. A tension measurement device as defined in claim 7 wherein the computer is further operative to:
   select the predetermined range of wrap angles based on a relationship of the tension value at each displacement increment relative to wrap angle.

9. A tension measurement device as defined in claim 7 wherein the computer is further operative to:
   select the predetermined range of wrap angles from a relatively more linear region of a relationship of the tension value at each displacement increment relative to the wrap angle.

10. A tension measurement device as defined in claim 7 wherein the computer is further operative to:
    select the predetermined range of wrap angles to fall predominantly within the range of three degrees to five degrees.

11. A tension measurement device as defined in claim 1 wherein an initial displacement interval of the relative displacement of the outer contact elements and the deflecting contact element is measured when the deflecting contact first contacts the filament and this is stored in the computer as the initial displacement and thickness dimension of the filament.

12. A tension measurement device as defined in claim 11 wherein the computer is further operative to:
    calculate the tension in the filament from a mathematical operation based on the force values calculated at each displacement increment and the thickness value.

13. A tension measurement device as defined in claim 1 wherein the computer is further operative to:
    determine from the force signal and the displacement increment signal, a tare force value on the deflecting contact element before the deflecting contact element first contacts the filament;
    determine the plurality of incremental force values relative to the tare force value; and
    calculate the tension in the filament from a mathematical operation based on the force values calculated at each displacement increment and the thickness value.

14. A tension measurement device as defined in claim 1 wherein the computer is further operative to:
    establish two set values which when compared to force signal provide two final values within a predetermined range of values; and
    calculate the force on the deflecting contact element by a mathematical operation which uses the two set values and the final values.

15. A tension measurement device as defined in claim 14 further comprising:
    a differential amplifier having a predetermined gain and operatively connected to receive the force signal and an analog set signal related to the set value established by the computer, the differential amplifier operative to amplify the difference between the force signal and the analog set signal by the predetermined gain and supply the amplified difference as an analog final signal; and wherein:
    the computer is further operative to:
       establish each final value corresponding to a final signal; and
       use the predetermined gain of the differential amplifier in the mathematical operation to calculate the force.

16. A tension measurement device for calculating tension in a filament by laterally deflecting the filament between two outer contact elements by force applied to a deflecting contact element positioned between the two outer contact elements, comprising:
    a displacement transducer connected relative to at least one of the outer contact elements and the deflecting contact element to create a displacement signal indicative of the relative displacement of the outer contact elements and the deflecting contact element;
    a force transducer connected to the deflecting contact element to create a force signal indicative of the force applied on the deflecting contact element as a result of the relative movement of the contact elements against the filament; and
    an improved force determination system comprising:
       an instrumentation amplifier connected to the displacement transducer to amplify the magnitude of the displacement signal as an analog coarse signal;
       an analog to digital converter (ADC) receptive of the coarse signal and operative to covert the coarse signal into a coarse digital number;
       a digital computer in communication with and set up to receive and store the coarse signals from the analog to digital converter and operative in accordance with an adjustment algorithm to create a set digital number which is related to but different from the coarse digital number;
       a digital to analog converter (DAC) receptive of the set digital number and operative to covert the set digital number into an analog set signal;
       a differential amplifier receptive of the coarse and set signals and having a predetermined gain value to amplify the difference between the coarse and set signals by the predetermined gain value and to supply the amplified difference as an analog final signal; and wherein
       the ADC is further receptive of the analog final signal and operative convert the analog final signal into a final digital number; and
       the computer upon receipt of the final digital number is operative to:

adjust the set digital number according to the adjustment algorithm in response to the final digital number to obtain two set digital numbers which result to two final digital numbers within a predetermined range of values; and calculate the force on the deflecting contact element by a mathematical calculation which uses the two set digital numbers, the final digital numbers which result from the two set digital numbers and the predetermined gain of the amplifier.

17. A tension measurement device as defined in claim 16 wherein the predetermined range of numbers is selected to reflect a final signal within a linear range of amplification of the differential amplifier.

18. A tension measurement device as defined in claim 17 wherein the adjustment algorithm changes the value of the set digital number with each instance of the final digital number falling outside of the predetermined range of values.

19. A tension measurement device as defined in claim 18 wherein the computer determines the two set values by comparing the final digital number to a selected value within the predetermined range of values.

20. A tension measurement device as defined in claim 19 wherein the selected value within the predetermined range of values is a value approximately at the midpoint of the predetermined range.

21. A tension measurement device as defined in claim 19 wherein the predetermined range of values is defined by a predetermined upper limit value and a predetermined lower limit value, the predetermined upper limit is less than the maximum count value of the ADC, and the predetermined range begins with a predetermined lower limit value greater than a zero count value of the ADC.

22. A method of calculating tension in a filament by laterally deflecting the filament between two outer contact elements by force applied to a deflecting contact element positioned between the two outer contact elements, comprising the steps of:

deflecting the filament between the two contact elements;

measuring the relative displacement of the outer contact elements and the deflecting contact element when the filament is deflected between the contact elements;

determining a plurality of displacement intervals over a range of relative displacement of the contact elements;

determining a plurality of incremental force values related to the force on the deflecting contact element occurring at each of the displacement intervals;

selecting a number, less than all, of the incremental force values; where the relationships between sequential force and related displacement values are approximating a linear relationship and calculating the tension in the filament based on the selected number of incremental force values.

23. A method as defined in claim 22 further comprising the step of:

calculating a tension value from each incremental force value at each displacement increment by a mathematical operation using the tension values calculated at each displacement increment.

24. A method as defined in claim 23 further comprising the step of:

filtering the plurality of tension values calculated at each displacement increment to reduce the effect any aberrant tension values in the mathematical operation.

25. A method as defined in claim 23 further comprising the steps of:

calculating a wrap angle of deflection of the filament at each displacement increment; and selecting a predetermined range of wrap angles from which to obtain the incremental force values to calculate the tension in the filament; and calculating the tension in the filament from a mathematical operation using the tension values calculated at each displacement increment within the predetermined range of wrap angles.

26. A method as defined in claim 25 further comprising the steps of:

selecting the predetermined range of wrap angles from a relatively more linear region of a relationship of the tension value at each displacement increment relative to the wrap angle.

27. A method of calculating tension in a filament by laterally deflecting the filament between two outer contact elements by force applied to a deflecting contact element positioned between the two outer contact elements, comprising the steps of:

deflecting the filament between the two contact elements;

measuring the relative displacement of the outer contact elements and the deflecting contact element when the filament is deflected between the contact elements;

obtaining a force signal created by force on the deflecting contact element;

establishing two different set values which are related to but not the same as the force signal;

comparing the two set values with the force signal;

amplifying the difference between each of the two set values and the force signal by a predetermined gain factor to create two final values within a predetermined range of values; and calculating the force on the deflecting contact element by a mathematical operation which uses the two set values, the final values, and the gain factor.

28. A method as defined in claim 27 further comprising the step of:

adjusting the set value until the two final values fall within the predetermined range of values.

* * * * *